US007350051B2

(12) United States Patent
Hinojosa et al.

(10) Patent No.: US 7,350,051 B2
(45) Date of Patent: Mar. 25, 2008

(54) METHOD TO OPTIMIZE EFFECTIVE PAGE NUMBER TO REAL PAGE NUMBER TRANSLATION PATH FROM PAGE TABLE ENTRIES MATCH RESUMPTION OF EXECUTION STREAM

(75) Inventors: Joaquin Hinojosa, Round Rock, TX (US); Sheldon B. Levenstein, Austin, TX (US); Bruce Joseph Ronchetti, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 389 days.

(21) Appl. No.: 11/054,277

(22) Filed: Feb. 9, 2005

(65) Prior Publication Data

US 2006/0179264 A1 Aug. 10, 2006

(51) Int. Cl.
*G06F 12/10* (2006.01)
*G06F 13/28* (2006.01)

(52) U.S. Cl. .................. 711/202; 711/150; 711/151; 711/167; 713/400

(58) Field of Classification Search ............... None
See application file for complete search history.

(56) References Cited

U.S. PATENT DOCUMENTS 6,209,053 B1 * 3/2001 Kurts ..................... 710/113
7,111,153 B2 * 9/2006 Kuttanna et al. .......... 712/216

OTHER PUBLICATIONS

Moore et al. (Translation Lookaside Buffer Cycle Stealing) (IBM Technical Disclosure Bulletin, vol. 37, No. 04B, Apr. 1994), pp. 527-528.*

* cited by examiner

*Primary Examiner*—Hyung S. Sough
*Assistant Examiner*—Kaushik Patel
(74) *Attorney, Agent, or Firm*—Duke W. Yee; Diana R. Gerhardt; Gerald H. Glanzman

(57) ABSTRACT

A method, system and computer program product for optimizing EPN to RPN translation when a data miss occurs. The method, system and computer program product take advantage of the high-likelihood of finding the matching PTE in the first half of the PTEG and utilize early data-coming signals from the L2 cache to prime the data-flow pipe to the D-ERAT arrays and requesting a joint steal cycle for executing the write into the D-ERAT and a restart request for re-dispatching the next-to-complete instruction.

6 Claims, 3 Drawing Sheets

METHOD TO OPTIMIZE EFFECTIVE PAGE NUMBER TO REAL PAGE NUMBER TRANSLATION PATH FROM PAGE TABLE ENTRIES MATCH RESUMPTION OF EXECUTION STREAM

BACKGROUND OF THE INVENTION

1. Technical Field

The present invention relates in general to a method for effective page number (EPN) to real page number (RPN) translation in processors. Specifically, the present invention relates to a method for optimizing EPN to RPN translation when a data miss occurs.

2. Description of Related Art

Processor-generated memory accesses require address translation before they go out to the memory subsystem. In present day computing, it is common to have a process executing only in main, or "physical," memory, while the user perceives a much larger "virtual" memory which is allocated on an external disk. To address the virtual memory, many processors contain a translator to translate virtual addresses, or effective page numbers (EPN), in virtual memory to physical addresses, or real page numbers (RPN), in physical memory, and a translation look-aside buffer (TLB), which caches recently generated virtual-physical address pairs, or page table entries (PTE). A group of eight PTEs is called a page table entry group (PTEG).

Most processors have a load store unit (LSU). There are usually one or more arrays in the LSU that serve as a data effective to real address translation (D-ERAT) location. These locations hold pairs of linked EPNs and RPNs. When the instruction decoding unit (IDU) issues an instruction, the real address is looked up in the D-ERAT. Usually, if the RPN is missing from the D-ERAT, the TLB will check the recently accessed PTEGs and find the missing address. Therefore, the PTEs must be checked to find the missing RPN. The PTEs are checked to see if the abbreviated virtual page number (AVPN) and page attributes matches the AVPN and page attributes of the EPN associated with the missing RPN. Once a match is found, the RPN from the matching PTE is installed in the D-ERAT.

However, not all processors have TLBs. For example, the International Business Machines p-series p6 processor chip design does not have a TLB. Therefore, when a D-ERAT miss occurs, the PTEG must be reloaded from the level two cache memory (L2). This has negative impact on performance and overhead as the current instruction is paused until the missing RPN is found. In a best-case scenario, the 128 bit PTEG reload, at a 32 byte data width, from the core to the L2 would take four nest clocks, which is equivalent to eight processor clocks, during which the eight PTEs are analyzed for a match. Once a match is found, the PTE's RPN data is then installed in the D-ERAT, and the next-to-complete instruction is restarted.

Even for processors with TLBs, the TLBs can miss as well. In such a case, the usual process is to reload all of the PTEGs first into the TLB and then look up the missing address from the TLB. In some instances, this can take more than 100 processor cycles and can cause code to run as much as thirty times slower than normal.

Therefore, in order to mitigate the impact on performance, it would be advantageous to have an improved method for EPN to RPN translation and resumption of the execution stream.

SUMMARY OF THE INVENTION

The present invention provides a method, system and computer program product for optimizing EPN to RPN translation when a data miss occurs. The method, system and computer program product utilize the placement of the desired PTE in the first half of the PTEG and the early data-coming signals from the L2 cache to prime the data-flow pipe to the D-ERAT arrays and requesting a steal cycle, for executing the write into the D-ERAT, with a dispatch-restart.

According to a preferred embodiment of the present invention, the method begins when the memory management unit (MMU) receives notification that a D-ERAT miss has occurred. The MMU then requests a reload of the required PTEG from the L2 cache memory. The L2 cache sends an early data-coming signal. Once this signal is received by the MMU, the MMU checks to see if the signal is the second early data-coming signal. If the signal is not the second early coming signal, the method waits for the second signal. If the signal is the second signal received, then the MMU sends a request for a steal cycle and thread specific dispatch-restart to the LSU's steal request arbiter. These steal cycle and dispatch-restart requests are presented to the IDU in time to allow the next-to-complete instruction to make use of a newly installed EPN-RPN translation based on a PTE match found in the first half of the PTEG. If the steal cycle request is not granted, then a new request for a steal cycle is generated. This process is repeated until a steal cycle is granted. Once a steal cycle has been granted, the method then checks to see if a match for the missing data has been found. If a match has not been found, then a new request for a steal cycle is generated. Once it is verified that a match has been found, then, during the steal cycle, the missing EPN-RPN translation is written to the D-ERAT, and the next-to-complete instruction is restarted and the method ends.

Concurrently with waiting on/verifying that a second early data-coming signal has been received and requesting a steal cycle, the MMU is finding a match for the missing data. The MMU does this by receiving the two PTE's from the L2 cache at the nest-core interface registers. The MMU then examines this data for a match against the search criteria. If there is no match, then the MMU waits to receive the next early data-coming signal and pair of PTEs. If a match to the search criteria is found, then the match found marker is set to yes and the data is held, waiting to be written to the D-ERAT.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
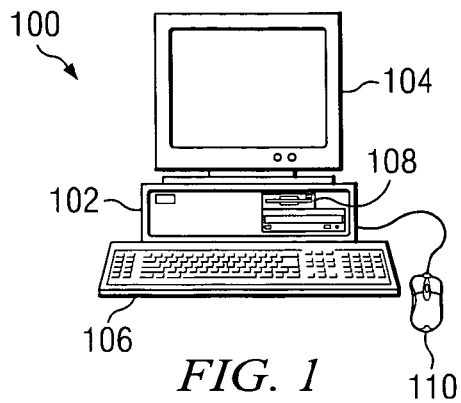
FIG. 1 is a pictorial representation of a data processing system in which the present invention may be implemented in accordance with a preferred embodiment of the present invention.

With reference now to the figures and in particular with reference to FIG. 1, a pictorial representation of a data processing system in which the present invention may be implemented is depicted in accordance with a preferred embodiment of the present invention. A computer 100 is depicted which includes system unit 102, video display terminal 104, keyboard 106, storage devices 108, which may include floppy drives and other types of permanent and removable storage media, and mouse 110. Additional input devices may be included with personal computer 100, such as, for example, a joystick, touchpad, touch screen, trackball, microphone, and the like. Computer 100 can be implemented using any suitable computer, such as an IBM eServer computer or IntelliStation computer, which are products of International Business Machines Corporation, located in Armonk, N.Y. Although the depicted representation shows a computer, other embodiments of the present invention may be implemented in other types of data processing systems, such as a network computer. Computer 100 also preferably includes a graphical user interface (GUI) that may be implemented by means of systems software residing in computer readable media in operation within computer 100.

Figure 2:
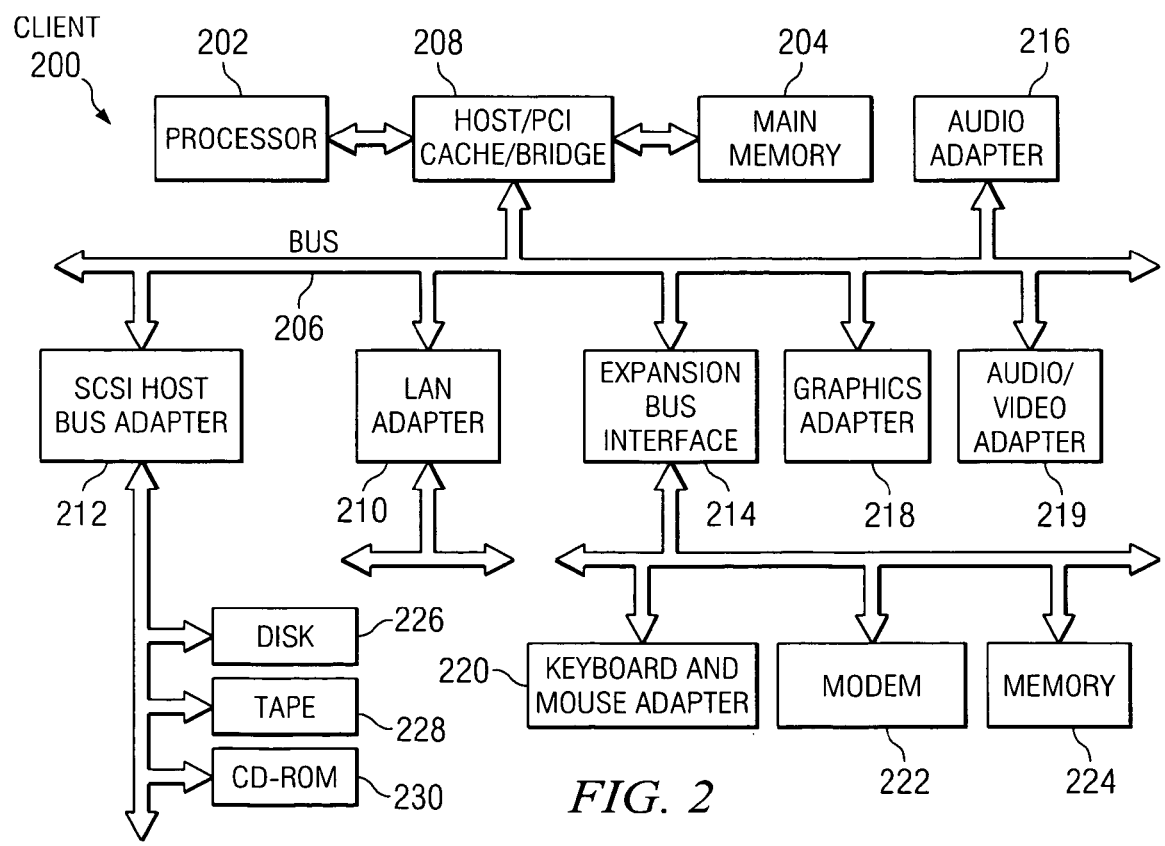
FIG. 2 is a block diagram of a data processing system in which the present invention may be implemented.

With reference now to FIG. 2, a block diagram of a data processing system is shown in which the present invention may be implemented. Data processing system 200 is an example of a computer, such as computer 100 in FIG. 1, in which code or instructions implementing the processes of the present invention may be located. Data processing system 200 employs a peripheral component interconnect (PCI) local bus architecture. Although the depicted example employs a PCI bus, other bus architectures such as Accelerated Graphics Port (AGP) and Industry Standard Architecture (ISA) may be used. Processor 202 and main memory 204 are connected to PCI local bus 206 through PCI bridge 208. PCI bridge 208 also may include an integrated memory controller and cache memory for processor 202. Additional connections to PCI local bus 206 may be made through direct component interconnection or through add-in connectors. In the depicted example, local area network (LAN) adapter 210, small computer system interface (SCSI) host bus adapter 212, and expansion bus interface 214 are connected to PCI local bus 206 by direct component connection. In contrast, audio adapter 216, graphics adapter 218, and audio/video adapter 219 are connected to PCI local bus 206 by add-in boards inserted into expansion slots. Expansion bus interface 214 provides a connection for a keyboard and mouse adapter 220, modem 222, and additional memory 224. SCSI host bus adapter 212 provides a connection for hard disk drive 226, tape drive 228, and CD-ROM drive 230. Typical PCI local bus implementations will support three or four PCI expansion slots or add-in connectors.

An operating system runs on processor 202 and is used to coordinate and provide control of various components within data processing system 200 in FIG. 2. The operating system may be a commercially available operating system such as Windows XP, which is available from Microsoft Corporation. An object oriented programming system such as Java may run in conjunction with the operating system and provides calls to the operating system from Java programs or applications executing on data processing system 200. "Java" is a trademark of Sun Microsystems, Inc. Instructions for the operating system, the object-oriented programming system, and applications or programs are located on storage devices, such as hard disk drive 226, and may be loaded into main memory 204 for execution by processor 202.

Those of ordinary skill in the art will appreciate that the hardware in FIG. 2 may vary depending on the implementation. Other internal hardware or peripheral devices, such as flash read-only memory (ROM), equivalent nonvolatile memory, or optical disk drives and the like, may be used in addition to or in place of the hardware depicted in FIG. 2. Also, the processes of the present invention may be applied to a multiprocessor data processing system.

For example, data processing system 200, if optionally configured as a network computer, may not include SCSI host bus adapter 212, hard disk drive 226, tape drive 228, and CD-ROM 230. In that case, the computer, to be properly called a client computer, includes some type of network communication interface, such as LAN adapter 210, modem 222, or the like. As another example, data processing system 200 may be a stand-alone system configured to be bootable without relying on some type of network communication interface, whether or not data processing system 200 comprises some type of network communication interface. As a further example, data processing system 200 may be a personal digital assistant (PDA), which is configured with ROM and/or flash ROM to provide non-volatile memory for storing operating system files and/or user-generated data.

The depicted example in FIG. 2 and above-described examples are not meant to imply architectural limitations. For example, data processing system 200 also may be a notebook computer or hand held computer in addition to taking the form of a PDA. Data processing system 200 also may be a kiosk or a Web appliance.

The processes of the present invention are performed by processor 202 using computer implemented instructions, which may be located in a memory such as, for example, main memory 204, memory 224, or in one or more peripheral devices 226-230.

Figure 3:
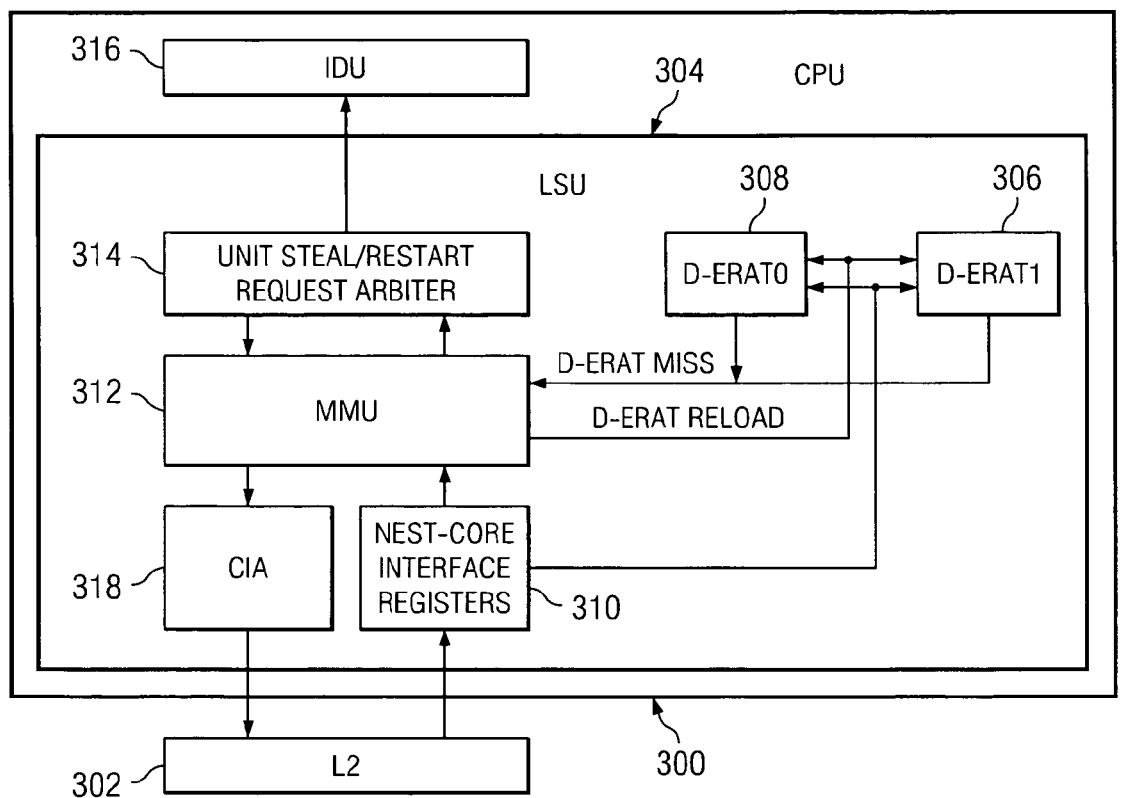
FIG. 3 is a block diagram of a processor core and L2 cache memory, in accordance with a preferred embodiment of the present invention.

FIG. 3 is a block diagram of a processor core and L2 cache memory, in accordance with a preferred embodiment of the present invention. Central processing unit (CPU) 300 contains several components, two of which are load store unit (LSU) 304 and instruction decode unit (IDU) 316. LSU 304 has several sub-components as well, including but not limited to, two D-ERATs, D-ERAT0 308 and D-ERAT1 306, nest-core interface registers, or boundary latch 310, memory management unit (MMU) 312, unit steal/restart request arbiter 314 and core interface arbiter (CIA) 318.

When a D-ERAT miss occurs, MMU 312 begins the process of locating the missing real address. MMU 312 sends a request for a reload of the PTEG from L2 cache memory (L2) 302. MMU 312 sends the request to CIA 318, which then transmits the request to L2 302. L2 302 sends a signal that data is coming to nest-core interface register 310 and then begins sending data, two PTEs at a time, to nest-core interface register 310. Nest-core interface register 310 then passes this data onto MMU 312, which checks it to see if the data matches the EPN associated with the missing RPN.

Each time before L2 302 sends data to nest-core interface register 310, L2 302 sends an early data-coming signal. Once the second early data-coming signal is received, MMU 312 sends a request for a steal cycle and a thread specific dispatch-restart to steal/restart request arbiter 314. If steal/ restart request arbiter 314 grants the request, then steal/restart request arbiter 314 sends the steal/restart cycle request to IDU 316. If the missing RPN has been found, then MMU 312 issues a write enable command and the data is written from nest-core interface register 310 to either D-ERAT0 306 or D-ERAT1 308, depending on which one suffered the miss.

Figure 4:
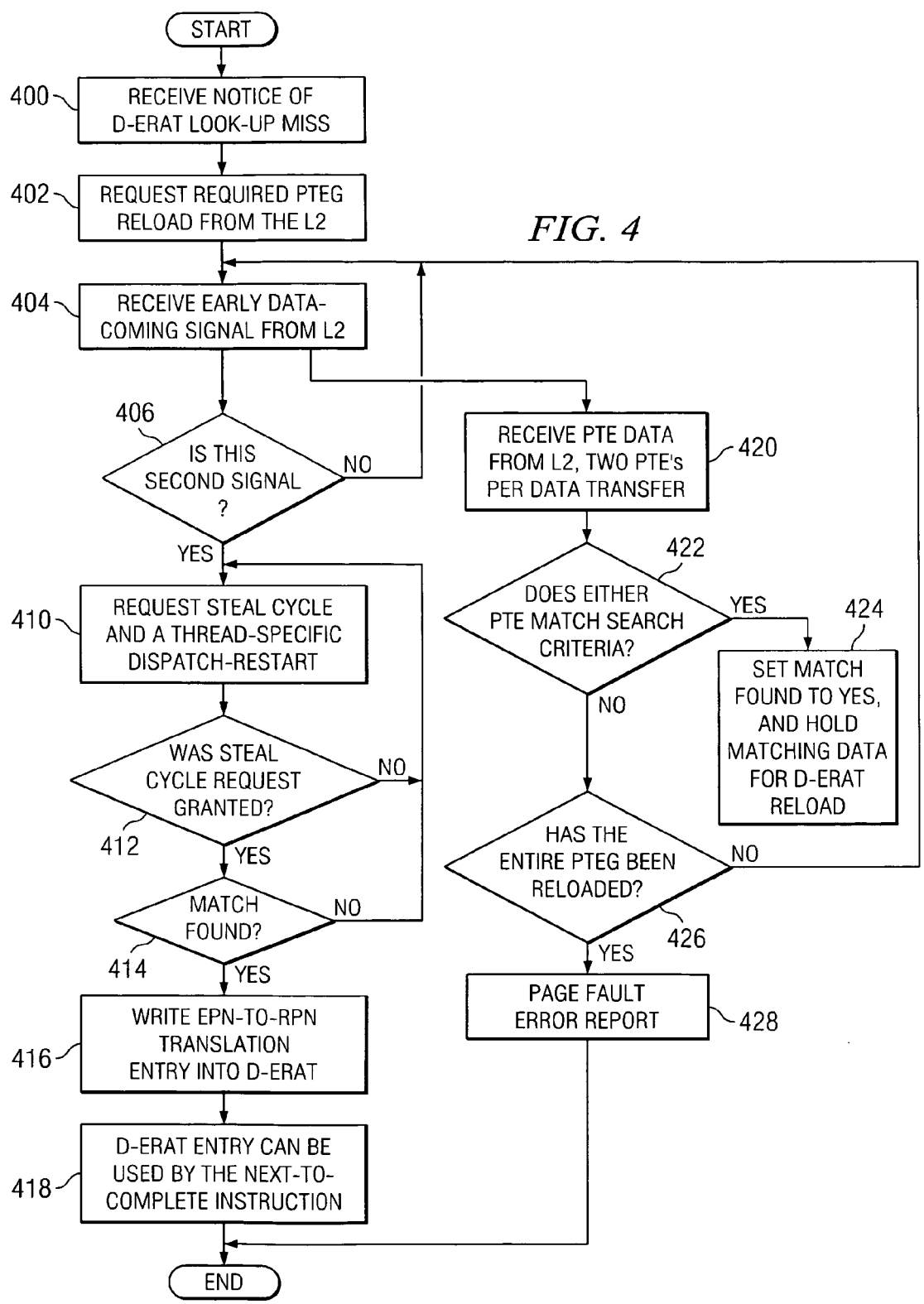
FIG. 4 is a flowchart that illustrates a method for EPN to RPN translation and resumption of the execution stream in accordance with a preferred embodiment of the present invention.

FIG. 4 is a flowchart that illustrates a method for EPN to RPN translation and resumption of the execution stream in accordance with a preferred embodiment of the present invention. The method begins when an MMU, for example MMU 312 in FIG. 3, receives notification that a D-ERAT miss has occurred (step 400). The MMU then requests a reload of the most recent PTEG from the L2 cache memory (step 402), such as L2 302 in FIG. 3. This request is communicated to the L2 by the CIA, such as CIA 318 in FIG. 3. The L2 sends an early data-coming signal.

Once an early data-coming signal is received by the MMU (step 404), the MMU checks to see if the signal is the second early data-coming signal received (step 406). The second early data-coming signal indicates that half of the PTEG's PTEs will have been transferred. If the early data-coming signal is not the second early data-coming signal (a no output to step 406), the method waits for the second early data-coming signal. If the early data-coming signal is the second early data-coming signal received (a yes output to step 406), then the MMU sends a request for a steal cycle and thread specific dispatch-restart to the LSU's steal/restart request arbiter (step 410). The method then checks to see if a steal cycle has been granted (step 412). If the steal cycle request is not granted (a no output to step 412), then a new request for a steal cycle is generated (step 410). This process is repeated until a steal cycle is granted. Once a steal cycle has been granted (a yes output to step 412), the method then checks to see if a match for the missing data has been found (step 414). If a match has not been found (a no output to step 414), then a new request for a steal cycle is generated (step 410). Once it is verified that a match has been found (a yes output to step 414), then during the steal cycle, the missing EPN to RPN translation is written to the D-ERAT (step 416), and the restarted next-to-complete instruction uses this EPN to RPN translation (step 418) the cycle after the steal and the method ends.

While the MMU is waiting on verifying that a second early data-coming signal has been received and requesting a steal cycle, the MMU is simultaneously examining the PTEs to find a match for the missing data. It does this by receiving two PTEs per cycle from the L2 cache at the nest-core interface register (step 420). The MMU then checks this data to see if the AVPN and page attributes of either of the PTEs received matches the AVPN and page attributes associated with the missing RPN (step 422). If neither one matches (a no output to step 422), then the MMU checks to see if the entire PTEG has been reloaded (step 426). If there are still outstanding PTE reloads (a no output to step 426), the MMU waits to receive the next pair of PTEs (step 404). If the entire PTEG has been received and no PTE match was found, (a yes output to step 426), a page-fault error is reported (step 428) and the method ends. If a match to the search criteria is found (a yes output to step 422), then the match found marker is set to yes and the data is held, waiting to be written to the D-ERAT (step 424).

This invention allows a re-dispatched next-to-complete instruction to make use of an EPN-RPN translation DERAT entry, the cycle after it was created based on a matching PTE found in the first half of the PTEG. This is facilitated by optimizing the data path, from receiving L2 cache reload data to reloading the EPN to RPN translation into D-ERAT, and utilizing the early data-coming signals to request the re-dispatch of the next-to-complete instruction.

While the above described method is described in terms of handling a D-ERAT miss, the same method can be applied to TLB misses, significantly reducing the negative impact and recovery time of TLB misses.

Additionally, while the above described method is described in terms of using the second early data-coming signal, the same method can use any early data-coming signal, such as the first, third, fourth, etc. to trigger the request of the re-dispatch of the next-to-complete instruction.

Thus the present invention solves the disadvantages of the prior art by providing a method for handling D-ERAT and TLB misses that takes advantage of early data-coming signals from the L2 cache to prime the data-flow pipe to the D-ERAT arrays and requesting a steal cycle for executing the write into the D-ERAT. The method, according to a preferred embodiment of the present invention, begins when the MMU receives notification that a D-ERAT miss has occurred. The MMU then requests a reload of the required PTEG from the L2 cache memory. The L2 cache sends an early data-coming signal. Once this signal is received by the MMU, the MMU checks to see if the signal is the second early data-coming signal. If the signal is not the second early coming signal, the method waits for the second signal. If the signal is the second signal received, then the MMU sends a request for a steal cycle and thread specific dispatch-restart to the LSU's steal request arbiter. These steal cycle and dispatch-restart requests are presented to the IDU in time to allow the next-to-complete instruction to make use of a newly installed EPN to RPN translation based on a PTE match found in the first half of the PTEG. If the steal cycle request is not granted, then a new request for a steal cycle is generated. This process is repeated until a steal cycle is granted. Once a steal cycle has been granted, the method then checks to see if a match for the missing data has been found. If a match has not been found, then a new request for a steal cycle is generated. Once it is verified that a match has been found, then, during the steal cycle, the missing EPN-RPN translation is written to the D-ERAT, and the next-to-complete instruction is restarted and the method ends.

Concurrently with waiting on/verifying that a second early data-coming signal has been received and requesting a steal cycle, the MMU is finding a match for the missing data. The MMU does this by receiving the two PTE's from the L2 cache at the nest-core interface registers. The MMU then examines this data for a match against the search criteria. If there is no match, then the MMU waits to receive the next early data-coming signal and pair of PTEs. If a match to the search criteria is found, then the match found marker is set to yes and the data is held, waiting to be written to the D-ERAT.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a data processing system, for optimizing effective page number to real page number translation in a processor when a data miss occurs, the method comprising:

receiving notice of a data miss;

requesting a reload of a page table entry group in response to receiving the notice of the data miss;

receiving a data-coming signal, wherein the data-coming signal is received prior to the data being sent and wherein the data-coming signal is a second data-coming signal;

responsive to receiving the data-coming signal, requesting a steal cycle and a thread specific dispatch-restart; and granting the steal cycle and the thread specific dispatch-restart.

2. The method of claim 1 further comprising:

receiving data; and comparing the data received against a search criteria.

3. The method of claim 2 further comprising:

responsive to granting the steal cycle and the thread specific dispatch-restart and to a determination that a match for the search criteria has been found, writing an effective page number to real page number translation in a data effective to real address translation (D-ERAT).

4. The method of claim 1, wherein he data miss comprises one of a data effective to real address translation (D-ERAT) miss or a translation look-aside buffer miss.

5. The method of claim 3 further comprising:

restarting a next-to-complete instruction.

6. The method of claim 2 wherein the search criteria comprises an abbreviated virtual page number and page attributes associated with a missing real page number.

* * * * *